(12) United States Patent
Guo et al.

(10) Patent No.: US 6,597,808 B1
(45) Date of Patent: Jul. 22, 2003

(54) USER DRAWN CIRCLED REGION EXTRACTION FROM SCANNED DOCUMENTS

(75) Inventors: Jinhong Guo, W. Windsor, NJ (US); Junichi Kanai, E. Windsor, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/454,633

(22) Filed: Dec. 6, 1999

(51) Int. Cl.⁷ .................................................. G06K 9/34
(52) U.S. Cl. ...................................... 382/173; 382/203
(58) Field of Search ................................ 382/172–180, 382/203; 707/517–521

(56) References Cited

U.S. PATENT DOCUMENTS

| | | | |
|---|---|---|---|
| 5,048,099 A | | 9/1991 | Lee |
| 5,201,011 A | * | 4/1993 | Bloomberg et al. ......... 382/175 |
| 5,579,407 A | * | 11/1996 | Murez ........................ 382/164 |
| 5,619,592 A | * | 4/1997 | Bloomberg et al. ......... 382/175 |
| 5,680,470 A | * | 10/1997 | Moussa et al. ............. 382/119 |
| 5,848,413 A | | 12/1998 | Wolff |
| 5,873,077 A | | 2/1999 | Kanoh et al. |
| 6,351,559 B1 | * | 2/2002 | Zhou et al. ................. 382/175 |

OTHER PUBLICATIONS

Tarjan, Robert, Depth–First Search and Linear Graph Algorithms, Siam Journal on Computing, Jun. 1972, pp. 146–160.
Theo Pavlidis, Algorithms for Graphics and Image Processing, Computer Science Press., 1982, p. 1–3.
Aho et al., The Design and Analysis of Computer Algorithms, pp. 179–187.
Aho et al., Data Structures and Algorithms, Jun. 1983, pp. 244–246, 252, 417.
http://www.rightfax.com/Products/ocr.htl, printed Aug. 17, 1998.
http://www.panasonic.co.jp/mgcs/fax/dx1000/dx1000.html, printed Jul. 12, 1999.
http://www.copiers–phones.com/cleveland/copiers/ifax/internet–fax.htm, printed Jul. 26, 1999.
Dr. Dobb's Essential Books on Graphic & Programming, Dr. Dobb's Journal, Miller Freeman, Inc., 1995.

* cited by examiner

Primary Examiner—Jingge Wu
(74) Attorney, Agent, or Firm—Harness, Dickey & Pierce, PLC (57) ABSTRACT

The scanned document is analyzed by connected component extraction and by calculating bounding boxes for each connected component. The connected components representing text, halftone images and characters overlapping the user-drawn circled region are eliminated to define candidate objects. The contour of candidate objects are generated and feature points are calculated including junctions of circles with other objects. Then, the user-drawn circled region is reconstructed by defining the contour segments belonging to the same circle. The user-drawn circle is recognized through a series of tests based on the size as well as the area the contour covers. The circle is further defined by removing or disregarding open arcs. After the user-drawn circle is fully identified, the image inside the bounding box of the contour is extracted and optical recognition may be optionally performed on the extracted image.

44 Claims, 9 Drawing Sheets

Figure 1

Chapter 1100 Statutory Invention Registration (SIR)

M

Request for Statutory Invention Registration (SIR) Examination of a SIR Review of Final Refusal to Publish a SIR Preparing a SIR for Publication Withdrawal of SIR Request SIR Publication and Effect 1101
Request for Statutory Invention
Registration (SIR)

*35 U.S.C17 Statutory invention registration.*

(a) Notwithstanding any other provision of this title, the Commissioner is authorized to publish a statutory invention registration containing the specification and drawings of a regularly filed application for a patent without examination if the applicant
(1) meets the requirements of section 112 of this title;

(2) has complied with the requirements for printing, as set forth in regulations of the Commissioner;

(3) waives the right to receive a patent on the invention within such period as may be prescribed by the Commissioner; and (4) pays application, publication, and other processing fees established by the Commissioner.

If an interference is declared with respect to such an application, a statutory invention registration may not be published unless the issue of priority of invention is finally determined in favor of the applicant.

(b) The waiver under subsection (a)(3) of this section by an applicant shall take effect upon publication of the statutory invention registration.

(c) A statutory invention registration published pursuant to this section shall have all of the attributes specified for patents in this title exceptthose specified in section 183 and sections 271 through 289 of this title. A statutory invention registration shall not have any of the attributes specified for patents in any other provision of law other than this title. A statutory invention registration published pursuant to this section shall give appropriate notice to the public, pursuant to regulations which the Commissioner shall issue, of the preceding provisions of this subsection. Tle invention with respect to which astatutory invention certificate is published is not a patented invention for purposes of section 292 of this title.

(d) The Secretary of Commerce shall report to the Congrem annuallyon the use of statutory invention registrations. Such report shall include an assessment of the degree to which agencies of the federal government are making use of the statutory invention registration system, the degree to which it aids the management of federally developed technology, and an assessment of the cost savings to the Federal Government of the uses of such procedures.

*37 CFR 1.293. Statutory invention registration.*

(a) An applicant for an original patent may request, at anytime during the pendency of applicant's pending complete application, that the specification and drawings be published as a statutory invention registration. Any

USER DRAWN CIRCLED REGION EXTRACTION FROM SCANNED DOCUMENTS

BACKGROUND AND SUMMARY OF THE INVENTION

The present invention relates generally to the electronic documents and imaging. More particularly, the invention relates to a system and method for identifying a user-circled region on a scanned document or bit mapped image, to allow information within the encircled region to be further analyzed as by optical character recognition.

With the rapid development of computer technologies, more and more documents have been archived in electronic form. The electronic form raises an entirely new set of issues concerning information retrieval.

Unlike alphanumeric text files, which can be keyword searched easily, files containing bitmapped images or scanned information cannot be so readily searched. This is because bitmapped images and scanned documents represent printed words as graphical pictures made up of tiny black, white or colored dots that are not directly recognizable by a computer as characters or letters of the alphabet. Fortunately, in many cases these graphical pictures of characters and letters can be converted into computer-recognizable text characters by employing optical character recognition (OCR) software. Even with fast computers, the optical character recognition conversion process is a slow one. In many cases it is simply not practical to convert entire bitmapped image for scanned documents using optical character recognition software.

In cases where it is not practical to employ optical character recognition conversion, document image databases may be indexed by the user manually assigning a character-based text name or label to each bitmapped image or scanned image. The computer then associates the text name or label with the image data, so that the image data can be later retrieved by searching upon the text name or label.

Manual entry of appropriate text names and labels is labor intensive and often requires additional computer hardware, including keyboard or numeric keypad connected to the document imaging station. Taking a fresh look at the indexing problem, some have suggested embedding technology within the document imaging system that would recognize user-circled regions. Such regions, if identified, could serve to localize, and thus minimize, the optical character recognition process. The user would circle the graphical image of a desired keyword, and the system would then perform optical character recognition on the image data within the circle, converting it into a label that would then be associated with the image data file.

Unfortunately, while the idea has merit, it has proven quite difficult to accurately and repeatedly detect the user-circled region, particularly given the wide variation in handwriting quality from one user to the next. The problem is further compounded by the fact that some user-drawn circles may overlap or intersect with other circles (whether user-drawn or not); and because some user-drawn "circles" may not be fully closed. The latter problem can arise where the user simply does not fully finish drawing a circle, or where the user-drawn circle is broken by image dropout. Image dropout can occur, for example, when a light or thin circle is drawn and then processed by low resolution scanning equipment.

The present invention addresses these problems by a system and method that "traces" a circle candidate, identifies key geometric features of the traced shape and then generates a substitute circle using the identified points as a guide. The substitute circle, having been computer generated, forms a fully closed circle structure that may be more reliably relied upon for extracting text contained within the circled region.

In instances where the user does not draw a fully closed circle, the system can employ one of a variety of endpoint proximity algorithms to ascertain whether the users intent was to draw a fully enclosed circle, or not.

For a more complete understanding of the invention, its objects and advantages, refer to the following specification and to the accompanying drawings.

BRIEF DESCRIPTION OF THE DRAWINGS

FIG. 1 is an example of a document page, showing a user-circled region;

DESCRIPTION OF THE PREFERRED EMBODIMENT

The system and method for extracting user-drawn circled regions can be applied in a wide variety of different applications. FIG. 1 illustrates an example of a document page with two (2) user-drawn circled regions at 20 and 22. Note that circle 20 is partially closed and circle 22 overlaps with an adjacent rectangular annotation. The document can be suitably digitized using a variety of different devices, including scanners, fax machines, digital photocopy machines, and the like. Once digitized, the document is represented as a bitmapped image, or scanned image. As will be more fully explained, the extraction system and method locates the user-drawn circled regions and extracts the encircled region content. The content may then be further processed as with optical character recognition software. The user-drawn circles can be applied using any suitable drawing instrument.

Figure 2:
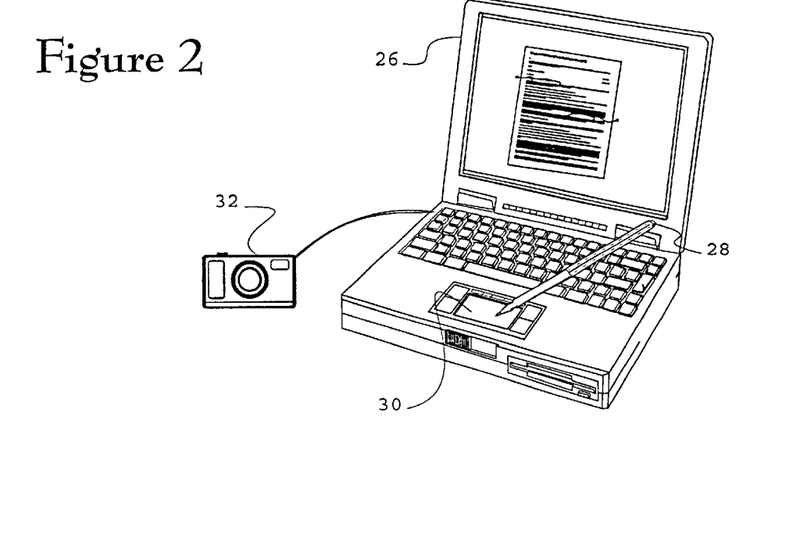
FIG. 2 is an example of an electronic document displayed on screen and circled by use of a stylus.

Alternatively, the document can be an electronic document, displayed upon the screen of a computer or document imaging display, for example. FIG. 2 illustrates an electronic document displayed upon the screen of a laptop computer 26 and in which the user-drawn circles are formed using a stylus 28 to draw on digitizing pad 30.

The embodiment of FIG. 2 illustrates that the document does not necessarily need to originate as a paper document. Rather, the document can be generated by software that creates a bitmapped image, such as any of the popular paintbrush programs or photo manipulation programs. Alternatively, the document can be input using a digital camera or video camera. To illustrate, FIG. 2 shows a digital camera 32 connected to computer 26. This camera can be used to take a picture of the document of interest. Thereafter, the user draws circled regions using stylus 28.

Figure 3:
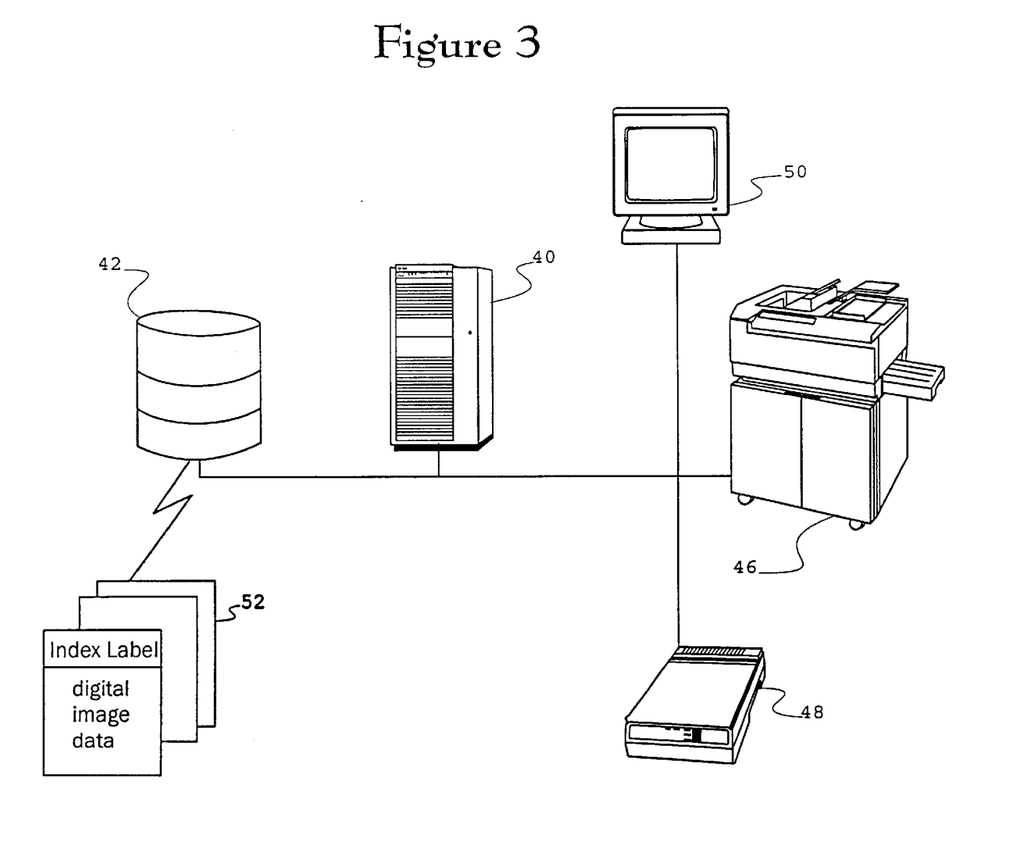
FIG. 3 illustrates a document image database system in accordance with the invention.

To further illustrate some of the possible uses for the invention, refer to FIG. 3, which shows an exemplary electronic document imaging system. The system includes a document imaging server 40 that has an associated storage medium such as a disk array 42. The server is coupled through suitable network communication link 44 to a variety of document input devices and viewing devices. For example, a digital copy machine 46 or flatbed scanner 48 can be used to convert paper documents into electronic form for storage by the server 40. Once digitized and stored, the document images may be viewed on any suitable workstations such as computer workstation 50.

Documents are stored in the document image database as a series of digital image data records to which an associated index label is attached, as illustrated diagrammatically at 52. The user-drawn circled region extraction system of the invention uses the extracted region to generate the index label by which the digital image data may be later retrieved. The region extraction system software may be hosted by any suitable processor in the system. Such processors include, for example, the server 40, the workstation 50, and even the processors associated with the copy machine 46 or flatbed scanner 48.

Figure 4:
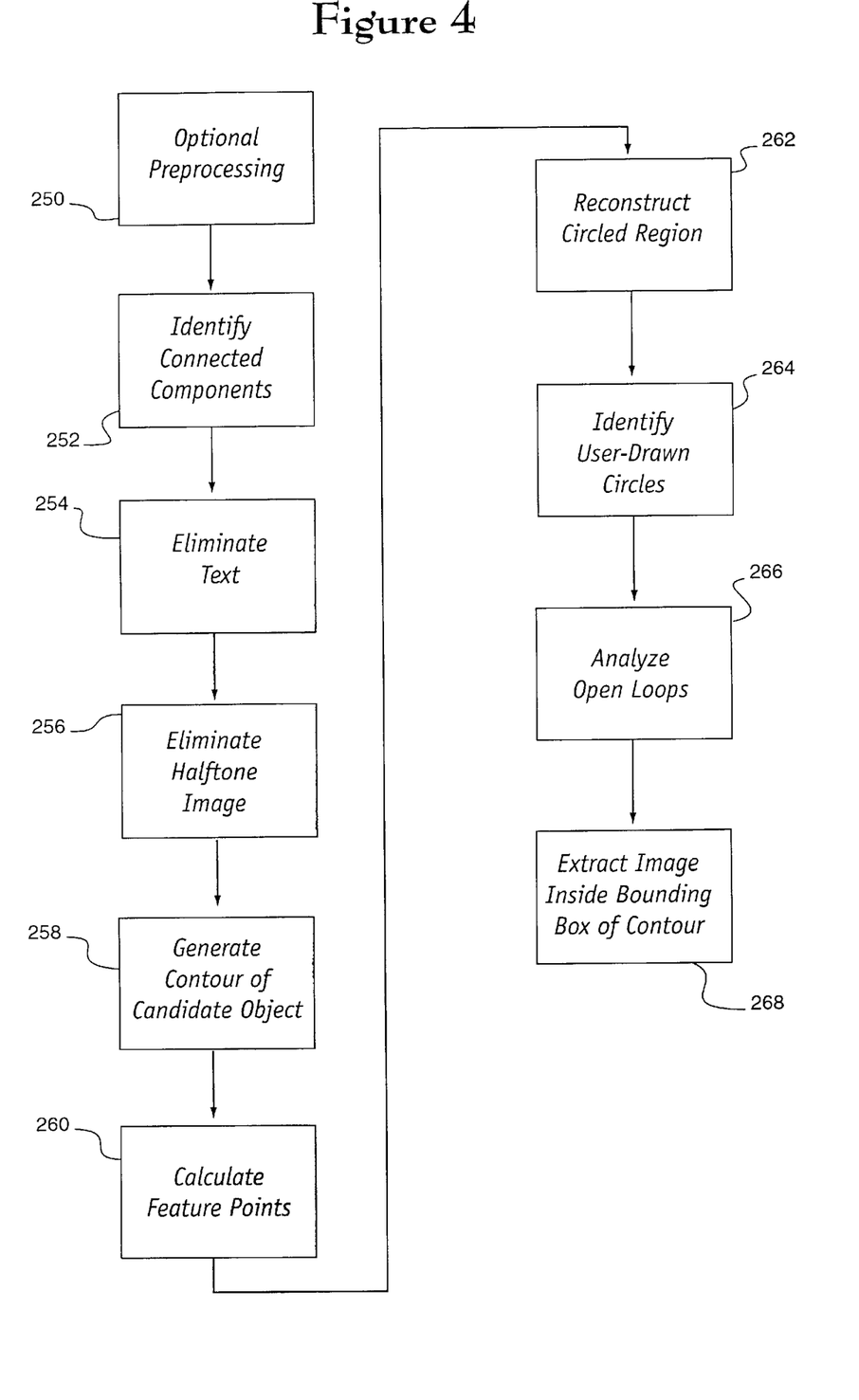
FIG. 4 is a flowchart illustrating the preferred steps for extracting circled regions from scanned or bitmapped documents.

The presently preferred embodiment of the circled region extraction process is illustrated in FIG. 4.

The presently preferred contour analysis technique is illustrated in FIG. 4. The technique is based on identifying the contour of a candidate object. The candidate object may include user-drawn circles, machine printed frames or other non-text materials on the page. By analyzing the contour using a feature extraction module, the algorithm extracts the user-drawn circle. The contour is represented by a sequence of points with different curvature values. This makes it possible to distinguish a user-drawn circle from a machine-printed frame through a post processing analytical technique. Referring to FIG. 4, to speed up the algorithm further, an optional pre-processing step may be performed at 250. The first step (step 252) is to find the connected components within a given page. In this step the image is scanned line-by-line and each pixel is labeled if it is connected with its neighboring pixels. After labeling the pixels for connectivity, a bounding box is calculated for each connected component. These bounding boxes are used to extract the candidate area in the image.

Next (at step 254) connected components representing text are eliminated. This is accomplished by analyzing the size of the bounding box and eliminating those connected components that have bounding boxes below a predetermined size. Eliminating connected components that are not likely user-drawn circle candidates helps speed up subsequent processing. However, if sufficient processing power is available, step 254 can be eliminated.

Next, halftone images are eliminated at step 256. Halftone images compose large connected components. The algorithm detects halftone images by assessing the black-to-white pixel ratio within the bounding box associated with the connected component in question. Halftone images tend to have more black pixels than areas containing text. Again, if sufficient processing power is available, it may not be necessary to eliminate half tone images at step 256. The preferred embodiment eliminates half tone images as user-drawn circle candidates, thus significantly improving processing speed.

The contour analysis technique may generate more feature points than are actually required when there are extraneous characters touching the contour in question. This can occur, for example, when the user draws a circle that happens to intersect with other characters on the page.

The optional pre-processing step eliminates these touching characters by performing a morphological operation to simplify the shape of the contour in the region where the user-drawn circle and extraneous character intersect.

Next, the user-drawn circle is identified by examining different candidate areas on the page. The first step in this procedure, depicted at 258, involves generating the contour of the candidate object. This is performed by tracing the outline of the object.

Figure 5:
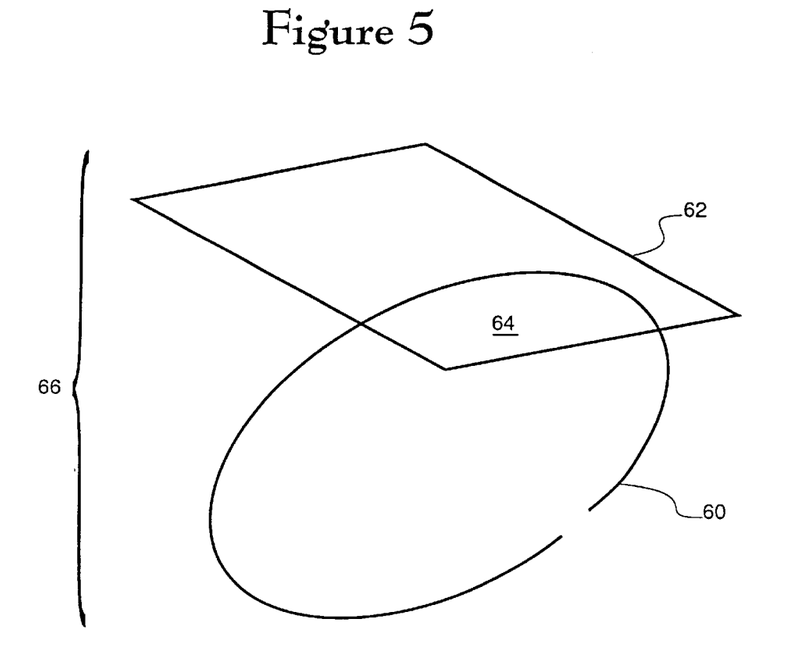
FIG. 5 is an example of overlapping objects.

By way of illustration, refer to FIG. 5, which shows an example of two (2) candidate areas. Note that these areas happen to overlap, which makes the user-drawn circle detection problem more difficult. Also note that shape 60 has a gap at 61 where the circle was either not fully formed or contains a dropout or some other defect. The algorithm must determine which of the contours is the user-drawn circle. In FIG. 5 there are four (4) possibilities: the elliptical shape 60, the rectangular shape 62, the overlapping intersection 64 of shapes 60 and 62, and the combined outer boundary shape 66 of shapes 60 and 62 combined.

The contour is represented in computer memory as an ordered set of points (coordinates of the boundary pixels). The tracing scheme first scans for the starting point (a border pixel that is not previously traced). Then the trace starts in either a clockwise or counter-clockwise direction along the convex outline of the object. When the trace goes back to the starting point, or to a point where no more black pixels can be found around the current one, the trace stops and the scanning process to find the next starting point continues.

Figure 6:
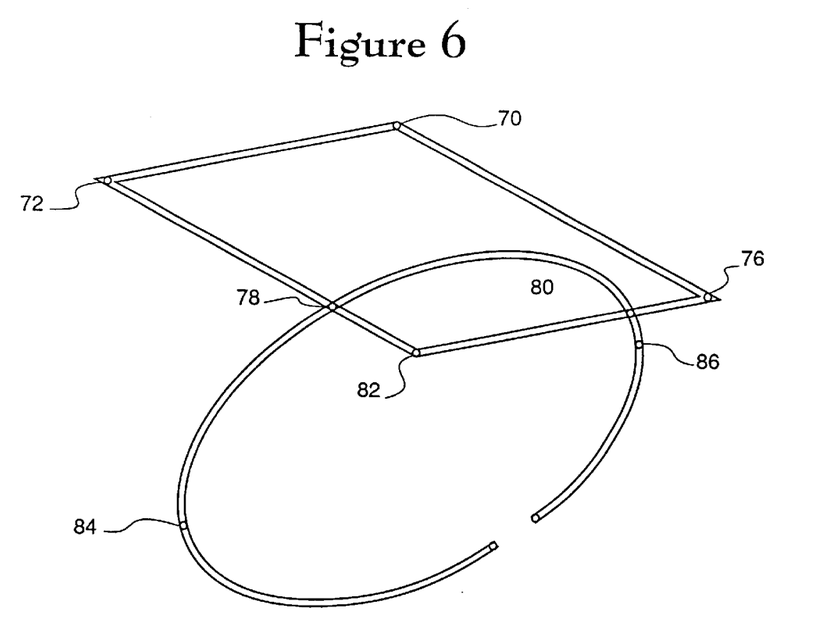
FIG. 6 is an example of the overlapping objects of FIG. 5, showing contours and feature points.

FIG. 6 shows an example of the trace contours that would result when the tracing step 258 is performed on the overlapping objects of FIG. 5. Note that the contour tracing appears as closely spaced double lines that follow the inside and outside perimeters of the lines that define the objects.

Next the contours obtained during step 258 are analyzed by calculating feature points associated with each contour (step 260). Contours obtained from step 258 can be closed curves or broken curves, due to noise in the image. Feature points are defined as high curvature points, including junctions of circles with other objects. Curvature can be calculated using re-sampling techniques, however this may not be reliable when noise is generated during the digitization process. By observation, the feature points can be detected approximately at either the local maxima or local minima on the x and y direction, even though not all maxima and minima are feature points. In the preferred implementation the starting point and ending point of each contour are treated as feature points. FIG. 6 shows the applicable feature points at 70–86.

After feature points have been identified, the circled region is reconstructed using the feature points. This is illustrated at step 262. In essence, each contour generated at step 258 is broken into segments at the feature points. These segments are examined and reconnected such that segments belonging to different objects are separated and those belonging to the same object are connected.

The main criterion for reconnecting the contour segments is to check the smoothness when making the transition between neighboring segments. For each contour segment, a small area around its starting and ending points is examined. The points on the two ends are fitted into lines so that the slope (angles coming and going out of the segment) can be estimated. These estimated angles are used to assess whether two line segments are approaching one another such that they should be connected as belonging to the same contour or are crossing one another such that they belong to unrelated contours.

Figure 7:
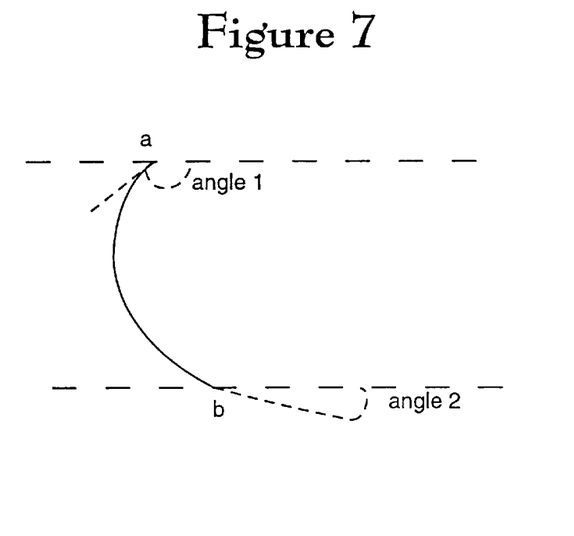
FIG. 7 is an illustration of incoming and outgoing angles.

FIG. 7 shows how each contour segment is assessed. The starting and ending points are examined by fitting the endpoints into lines, so that the slope may be assessed. In FIG. 7, angle 1 is the incoming angle and angle 2 is the outgoing angle. The direction of the contour segment in FIG. 7 is from a to b. The incoming angle is estimated by fitting the first few points of the segment into a line and calculating its slope. The outgoing angle is estimated in a similar way by fitting the last points of the segment into a line. The angles are defined such that they are in a range of +or−180°.

Figure 8:
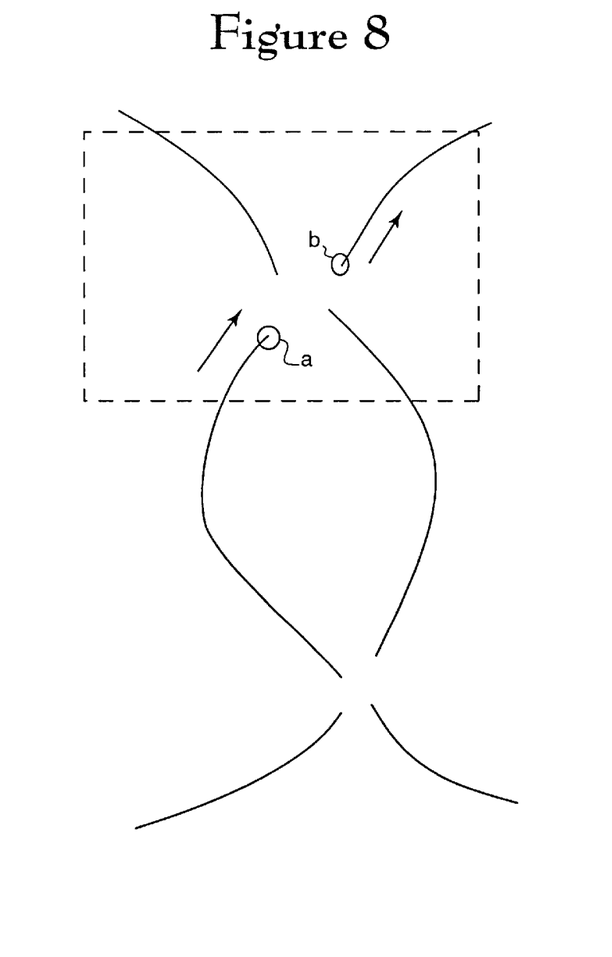
FIG. 8 is an example of reconnecting according to the preferred smoothness algorithm.

For each segment contour, the algorithm examines all the starting and ending points that are located in its neighborhood areas. If there is only one neighbor, the algorithm does not need to check the smoothness of the changing of the angles. The algorithm simply connects the points together. If there are multiple neighbors, then the algorithm chooses the one neighbor that makes the smoothest transition. This is illustrated in FIG. 8. In FIG. 8 starting and ending points a and b would thus be connected.

Figure 9A:
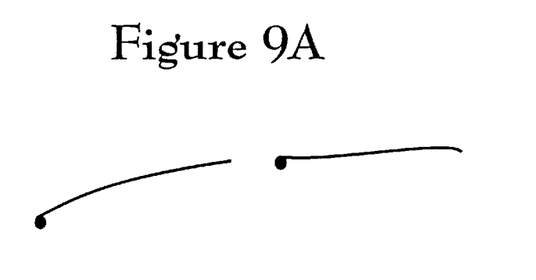
FIGS. 9A–9D illustrate four (4) different cases for connecting two (2) segments.

FIGS. 9A–9D illustrate several cases for connecting the two (2) segments when the smoothness criterion is met. We refer to the left segment as segment 1 and the right segment to segment 2 in the following description. The dots appearing on the segments represent the starting points, The property of smoothness may best be defined as follows:

(a) Smoothness is defined as the difference of the outgoing angle of segment 1 and the incoming angle of segment 2. If the smoothness condition is satisfied, append segment 2 to segment 1.

Figure 9B:
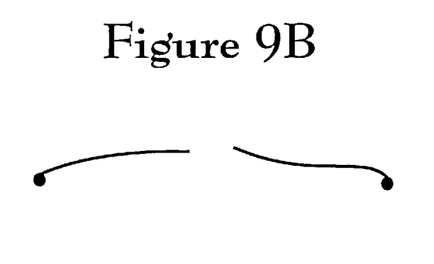

(b) Smoothness is defined as the difference of the outgoing angle of segment 1 and the reverse of the outgoing angle of segment 2. If the smoothness condition is satisfied, reverse segment 2 and then append to segment 1.

Figure 9C:
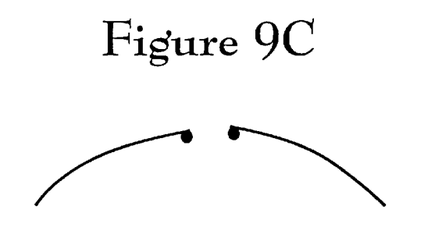

(c) Smoothness is defined as the difference of the reverse of the incoming angle of segment 1 and the incoming angle of segment 2. If the smoothness condition is satisfied, reverse segment 1, then append segment 2 to segment 1.

Figure 9D:
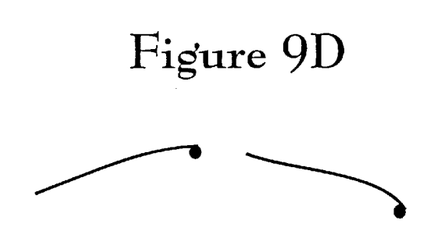

(d) Smoothness is defined as the difference of the incoming angle of segment 1 and the outgoing angle of segment 2. If the smoothness condition is satisfied, append segment 1 to segment 2.

Figure 10:
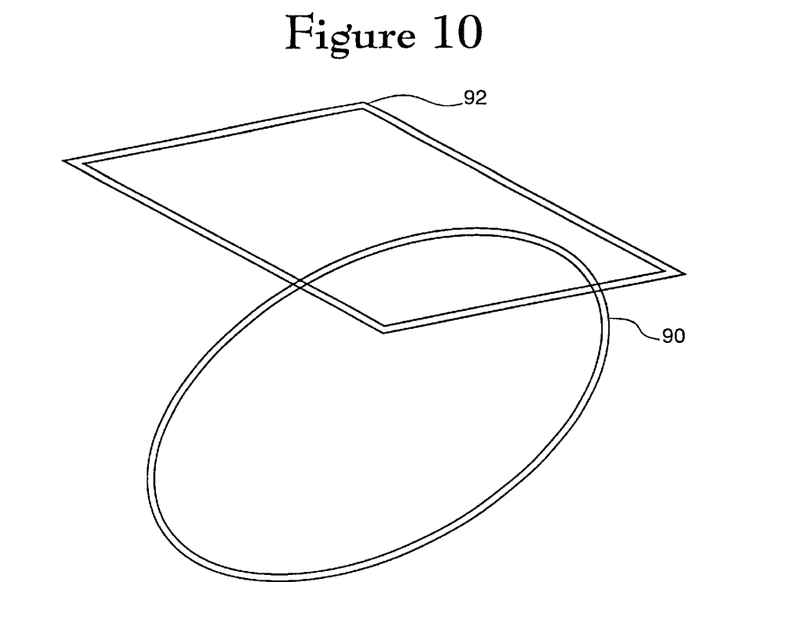
FIG. 10 illustrates the reconnecting of feature points using the example of FIGS. 5 and 6.

Based on these criteria, the algorithm reconnects the contour segments that are split at the feature points. FIG. 10 shows the results after reconnection, in which process the segmented contours are formed into two (2) different objects, elliptical object 90 and rectangular object 92.

Referring once again to FIG. 4, using the circles reconstructed at step 262, the user-drawn circles are identified at step 264 through a series of tests. The first test is based on the size of the contour as well as the area the contour covers. If the length of the contour exceeds a predetermined threshold and the bounding box of the contour covers a predetermined area, the algorithm considers the contour to be a user-drawn circle.

However, in order to discriminate between user-drawn circles and machine-printed frames, such as rectangular frames, machine-printed circles or tables, the smoothness of the connected contour is examined. One way to measure smoothness is to calculate the average curvature along the connected contour. If smoothness exceeds a predetermined threshold, the contour is considered to be machine-printed. Smoothness scan be expressed as:

Equation 1 if $\bar{C} \geq T_{curvature}$, machine generated if $\bar{C} < T_{curvature}$, user drawn $T_{curvature}$, threshold $\bar{C} = \sum_i C(i)$, $C(i)$ is the curvature value along the curve Because the algorithm reconstructs circled regions from the calculated feature points, it is able to identify user-drawn circles even if they contain small gaps or breaks. If desired, the user-drawn circle candidates can be further evaluated to determine if any gaps are sufficiently large to warrant rejection as user-drawn circles. The analysis (depicted at step 266) involves assessing the distant between the starting point and ending point of a contour. Distance can be assessed in a variety of different ways.

Figure 11A:
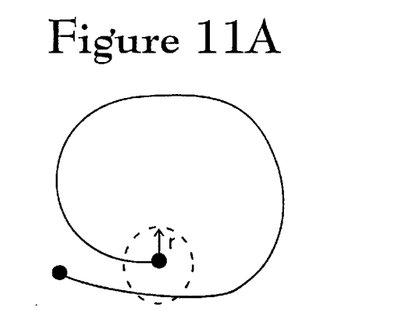
FIGS. 11A–11C illustrate three (3) alternate embodiments of a closed loop criterion function.
Figure 11B:
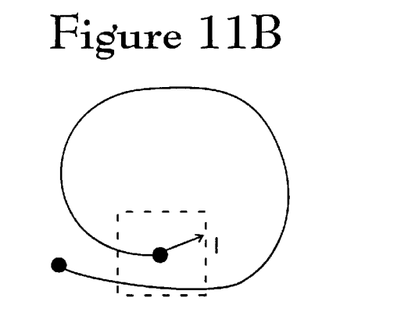
Figure 11C:
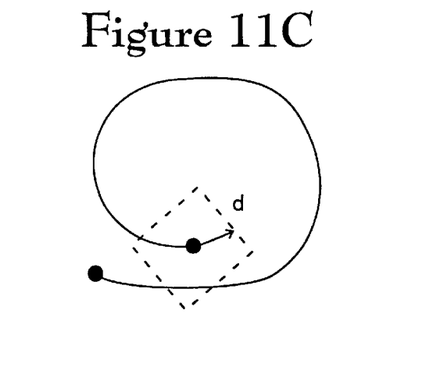

One technique for assessing distance is to determine whether one end point is within a predetermined radial distance from the other end point. See FIG. 11A. We refer to this as a circular distance function. Another technique is to define a square bounding box of predetermined size around one end point and to determine whether the other end point is within that bounding box. See FIG. 11B. We refer to this as the square distance function. A third technique is to define a square bounding box of predetermined size around one end point and then to rotate the bounding box around that end point to determine if at any rotational orientation the second end point falls within the bounding box. This will occur, if at all, when one corner of the bounding box lies on a line between the two end points. See FIG. 11C. We call this the Manhattan distance function.

Figure 12A:
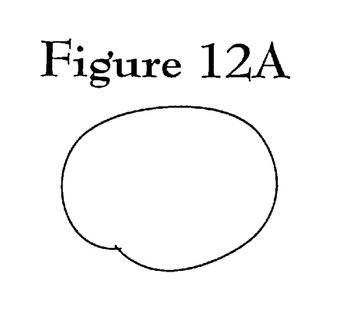
FIGS. 12A–12G illustrate examples of accepted and rejected objects.
Figure 12B:
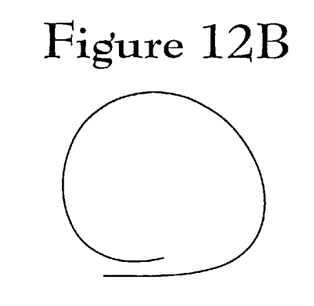
Figure 12C:
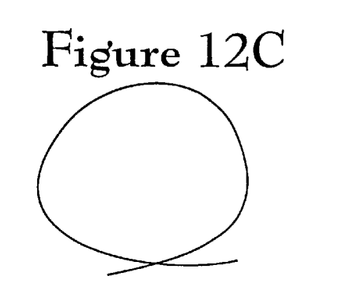
Figure 12D:
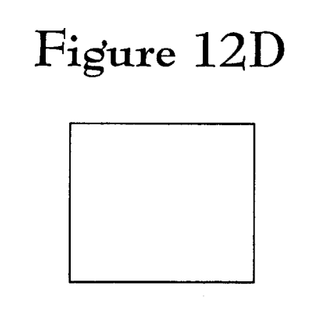
Figure 12E:
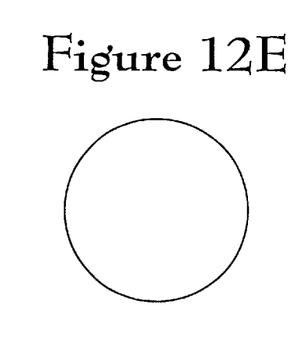
Figure 12F:
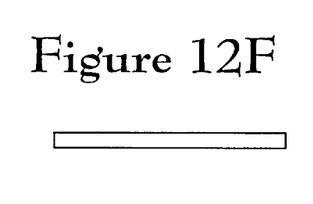
Figure 12G:
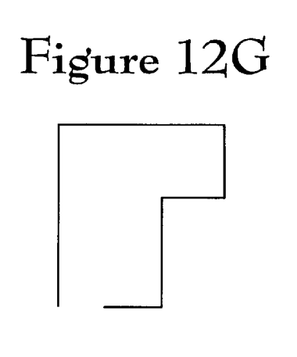

If the contour fails to pass any of the above tests, then it is considered to be an open arc, as opposed to a user-drawn circle. Illustrations of accepted circles are shown in FIGS. 12A–12C. Rejected objects are shown in FIGS. 12D–12G. Once the user-drawn circle is identified as described above, the bounding box around its contour is used to delimit the region that will be extracted for subsequent optical character recognition analysis. This is illustrated at step 268. The image inside the bounding box of the contour is extracted and optical character recognition may be optionally performed on the extracted image.

As illustrated in FIG. 6, a user-drawn circle has two (2) edges that thus causes two (2) sets of contours to be generated, one inside the other. The algorithm uses the larger of the two (2) bounding boxes for region extraction.

Figure 13A:
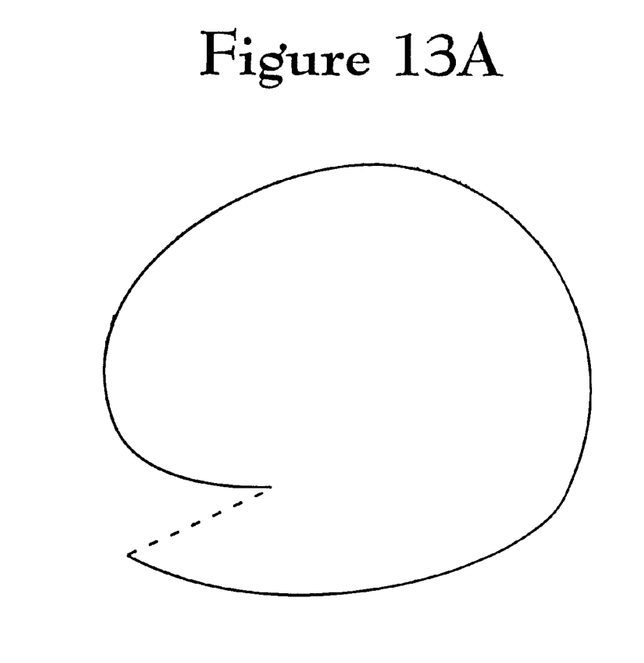
FIGS. 13A–13B provide two (2) examples for closing a gap within a user-drawn circle for display.
Figure 13B:
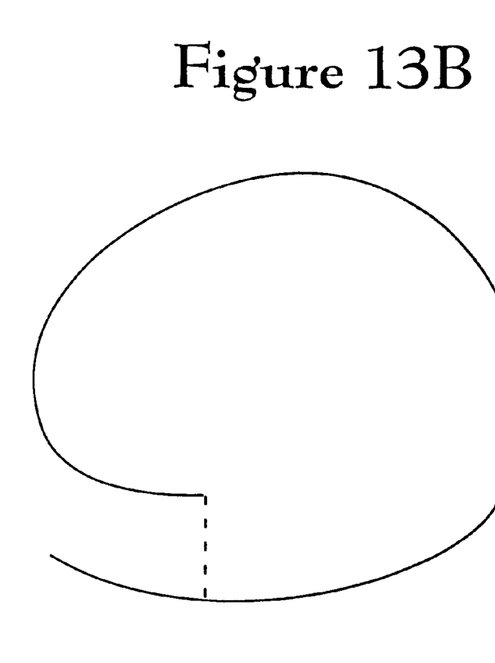

In a document imaging system, the extracted circled region can be displayed in a variety of formats. One way is to output the circled regions as sub-images. Another is to output the entire page, with the user-circled regions highlighted in color. A further option is to have the inside of the circle highlighted. To do this, the gaps on the contour must be closed. Closure may be handled in several ways. Two (2) are illustrated in FIGS. 13A and 13B. In 13A, closure is effected by connecting the end points directly. In FIG. 13B closure is effected by having one end point connect with the point on the curve that has the minimum distance between the end point and the curve.

In addition to extracting the user-drawn region for display, the system can also process the extracted region using optical character recognition techniques to construct index labels for document storage and retrieval purposes.

While the invention has been described in its presently preferred embodiments, it will be understood that certain modifications can be made to these embodiments without departing from the spirit of the invention as set forth in the appended claims.

What is claimed is:

1. A computer-implemented method of extracting a user-drawn circled region within image data, the image data having at least one candidate object, comprising the steps of:
    generating a contour representative of a candidate object;
    calculating feature points for said contour of said candidate object;
    reconstructing said user-circled region based on said feature points of said contour; and
    defining a transition smoothness metric and using said metric in constructing said user-circled region, wherein said transition smoothness metric:
        (a) identifies incoming and outgoing segments;
        (b) determines an angle associated with said incoming and outgoing segments; and
        (c) associates an incoming segment with an outgoing segment if their respective associated angles are within a predetermined relationship to one another.

2. The method of claim 1 wherein said feature points are defined as high curvature points which are detected approximately at either the local maxima or local minima on the x and y directions.

3. The method of claim 1 wherein said step of reconstructing said user-circled region further comprises the steps of:
    dividing said contour of said candidate object into segments at said feature points;
    examining the transition smoothness between segments;
    separating said segments belonging to different candidate objects; and
    connecting said segments belonging to the same candidate objects.

4. The method of claim 1 further comprising the step of:
    when reconstructing the circles using the feature points, analyzing if an openloop occurs in said first candidate object using a near closed loop criterion function.

5. The method of claim 1 for discriminating said user-drawn circled region from a machine printed frame further comprising:
    comparing the smoothness of said contour of said candidate object with a predetermined value representative of a smoothness of said machine printed frame.

6. The method of claim 1 wherein said step of identifying said user-drawn circled region further comprises the steps of:
    comparing the smoothness of said contour of said candidate object with a predetermined value representative of a smoothness of a machine printed frame; and
    analyzing if an openloop occurs in said candidate object using a near closed loop criterion function.

7. The method of claim 4 wherein said step of analyzing if an openloop occurs further comprises the steps of:
    assessing a distance between a starting point of said first candidate object and an ending point of said first candidate object;
    performing a circular distance function;
    performing a square distance function; or
    performing a Manhattan distance function wherein said first candidate object is defined as said user-drawn circled region only if said first candidate object passes one of said three functions.

8. The method of claim 7 wherein said circular distance function determines whether said starting point of said first candidate object is within a predetermined radial distance from said ending point of said first candidate object.

9. The method of claim 7 wherein said square distance function determines whether said ending point of said first candidate object is within a square bounding box of predetermined size around said ending point.

10. The method of claim 7 wherein said Manhattan distance function rotates said square bounding box of predetermined size around said ending point of said first candidate object in order to determine whether said starting point falls within said bounding box at any rotational orientation.

11. The method of claim 1 wherein said step of generating said contour representative of said candidate object further comprising the steps of:
    identifying connect components within the image data;
    calculating a bounding box for each of said connected components;
    eliminating text from each of said bounding boxes by analyzing the size of each bounding box;
    eliminating halftone images by assessing the black-to-white pixel ratio within said bounding boxes remaining after said elimination of text;
    extracting at least one candidate object from said bounding boxes remaining after said elimination of halftone image prior to the step of generating said contours; and
    tracing outline of said candidate objects to generate contours.

12. The method of claim 5 further comprising the step of eliminating characters touching said candidate object by performing a morphological operation to simplify a shape of said candidate object where said candidate objects and said character intersect.

13. The method of claim 1 further comprising the step of extracting an image inside said user-drawn circled region.

14. A computer-implemented method of extracting a user-drawn circled region within image data, comprising:
    extracting a candidate object from said image data;
    applying an openloop criterion function to said candidate object to identify and assess the relationship between a starting point and an ending point associated with said candidate object;
    identifying said candidate object as a user drawn circle if said starting point and said ending point bear at least one predetermined relationship to each other.

15. The method of claim 14 wherein said at least one predetermined relationship employs a circular distance function.

16. The method of claim 14 wherein said at least one predetermined relationship employs a square distance function.

17. The method of claim 14 wherein said at least one predetermined relationship employs a Manhattan distance function.

18. A computer-implemented method of extracting a user-drawn circled region within image data, the image data having at least one candidate object, comprising the steps of:
generating a contour representative of a candidate object;
calculating feature points for said contour of said candidate object; and
reconstructing said user-circled region based on said feature points of said contour, wherein said reconstructing includes analyzing if an openloop occurs in said first candidate object using a near closed loop criterion function, and said analyzing includes:
(a) assessing a distance between a starting point of said first candidate object and an ending point of said first candidate object;
(b) performing a circular distance function;
(c) performing a square distance function; or
(d) performing a Manhattan distance function wherein said first candidate object is defined as said user-drawn circled region only if said first candidate object passes one of said three functions.

19. The method of claim 18 wherein said feature points are defined as high curvature points which are detected approximately at either the local maxima or local minima on the x and y directions.

20. The method of claim 18 wherein said step of reconstructing said user-circled region further comprises the steps of:
dividing said contour of said candidate object into segments at said feature points;
examining the transition smoothness between segments;
separating said segments belonging to different candidate objects; and
connecting said segments belonging to the same candidate objects.

21. The method of claim 18 further comprising:
defining a transition smoothness metric and using said metric in constructing said user-circled region.

22. The method of claim 18 wherein said transition smoothness metric:
identifies incoming and outgoing segments;
determines an angle associated with said incoming and outgoing segments; and
associates an incoming segment with an outgoing segment if their respective associated angles are within a predetermined relationship to one another.

23. The method of claim 18 for discriminating said use-drawn circled region from a machine printed frame further comprising:
comparing the smoothness of said contour of said candidate object with a predetermined value representative of a smoothness of said machine printed frame.

24. The method of claim 18 wherein said step of identifying said user-drawn circled region further comprises the steps of:
comparing the smoothness of said contour of said candidate object with a predetermined value representative of a smoothness of a machine printed frame; and
analyzing if an openloop occurs in said candidate object using a near closed loop criterion function.

25. The method of claim 18 wherein said circular distance function determines whether said starting point of said first candidate object is within a predetermined radial distance from said ending point of said first candidate object.

26. The method of claim 18 wherein said square distance function determines whether said ending point of said first candidate object is within a square bounding box of predetermined size around said ending point.

27. The method of claim 18 wherein said Manhattan distance function rotates said square bounding box of predetermined size around said ending point of said first candidate object in order to determine whether said starting point falls within said bounding box at any rotational orientation.

28. The method of claim 18 wherein said step of generating said contour representative of said candidate object further comprising the steps of:
identifying connect components within the image data;
calculating a bounding box for each of said connected components;
eliminating text from each of said bounding boxes by analyzing the size of each bounding box;
eliminating halftone images by assessing the black-to-white pixel ratio within said bounding boxes remaining after said elimination of text;
extracting at least one candidate object from said bounding boxes remaining after said elimination of halftone image prior to the step of generating said contours; and
tracing outline of said candidate objects to generate contours.

29. The method of claim 23 further comprising the step of eliminating characters touching said candidate object by performing a morphological operation to simplify a shape of said candidate object where said candidate objects and said character intersect.

30. The method of claim 18 further comprising the step of extracting an image inside said user-drawn circled region.

31. A computer-implemented method of extracting a user-drawn circled region within image data, the image data having at least one candidate object, comprising the steps of:
generating a contour representative of a candidate, object;
calculating feature points for said contour of said candidate object; and
reconstructing said user-circled region based on said feature points of said contour,
wherein said step of generating said contour representative of said candidate object comprises the steps of:
(a) identifying connect components within the image data;
(b) calculating a bounding box for each of said connected components;
(c) eliminating text from each of said bounding boxes by analyzing the size of each bounding box;
(d) eliminating halftone images by assessing the black-to-white pixel ratio within said bounding boxes remaining after said elimination of text;
(e) extracting at least one candidate object from said bounding boxes remaining after said elimination of halftone image prior to the step of generating said contours; and
(f) tracing outline of said candidate objects to generate contours.

32. The method of claim 31 wherein said feature points are defined as high curvature points which are detected approximately at either the local maxima or local minima on the x and y directions.

33. The method of claim 31 wherein said step of reconstructing said user-circled region further comprises the steps of:

dividing said contour of said candidate object into segments at said feature points;

examining the transition smoothness between segments;

separating said segments belonging to different candidate objects; and connecting said segments belonging to the same candidate objects.

34. The method of claim 31 further comprising the step of:

when reconstructing the circles using the feature points, analyzing if an openloop occurs in said first candidate object using a near closed loop criterion function.

35. The method of claim 31 further comprising:

defining a transition smoothness metric and using said metric in constructing said user-circled region.

36. The method of claim 35 wherein said transition smoothness metric:

identifies incoming and outgoing segments;

determines an angle associated with said incoming and outgoing segments; and associates an incoming segment with an outgoing segment if their respective associated angles are within a predetermined relationship to one another.

37. The method of claim 31 for discriminating said use-drawn circled region from a machine printed frame further comprising:

comparing the smoothness of said contour of said candidate object with a predetermined value representative of a smoothness of said machine printed frame.

38. The method of claim 31 wherein said step of identifying said user-drawn circled region further comprises the steps of:

comparing the smoothness of said contour of said candidate object with a predetermined value representative of a smoothness of a machine printed frame; and analyzing if an openloop occurs in said candidate object using a near closed loop criterion function.

39. The method of claim 34 wherein said step of analyzing if an openloop occurs further comprises the steps of:

assessing a distance between a starting point of said first candidate object and an ending point of said first candidate object;

performing a circular distance function;

performing a square distance function; or performing a Manhattan distance function wherein said first candidate object is defined as said user-drawn circled region only if said first candidate object passes one of said three functions.

40. The method of claim 39 wherein said circular distance function determines whether said starting point of said first candidate object is within a predetermined radial distance from said ending point of said first candidate object.

41. The method of claim 39 wherein said square distance function determines whether said ending point of said first candidate object is within a square bounding box of predetermined size around said ending point.

42. The method of claim 39 wherein said Manhattan distance function rotates said square bounding box of predetermined size around said ending point of said first candidate object in order to determine whether said starting point falls within said bounding box at any rotational orientation.

43. The method of claim 37 further comprising the step of eliminating characters touching said candidate object by performing a morphological operation to simplify a shape of said candidate object where said candidate objects and said character intersect.

44. The method of claim 31 further comprising the step of extracting an image inside said user-drawn circled region.

* * * * *

UNITED STATES PATENT AND TRADEMARK OFFICE
CERTIFICATE OF CORRECTION

PATENT NO.   : 6,597,808 B1
DATED        : July 22, 2003
INVENTOR(S)  : Jinhong Guo et al.

It is certified that error appears in the above-identified patent and that said Letters Patent is hereby corrected as shown below:

Column 9,
Line 52, "use-drawn" should be -- user-drawn --

Column 10,
Line 39, "candidate," should be -- candidate --

Column 11,
Line 26, "use-drawn" should be -- user-drawn --

Signed and Sealed this

Twenty-fifth Day of November, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,597,808 B1
DATED : July 22, 2003
INVENTOR(S) : Jinhong Guo et al.

It is certified that error appears in the above-identified patent and that said Letters Patent is hereby corrected as shown below:

<u>Title page,</u>
Item [73], Assignee, "Matsushita Electric Industrial Co., Ltd., Osaka (JP)" should be
-- Matsushita Electric Corporation of America, Pinceton, NJ (US) --

<u>Column 9,</u>
Line 52, "use-drawn" should be -- user-drawn --

<u>Column 10,</u>
Line 39, "candidate," should be -- candidate --

<u>Column 11,</u>
Line 26, "use-drawn" should be -- user-drawn --

Signed and Sealed this

Thirteenth Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,597,808 B1
DATED : July 22, 2003
INVENTOR(S) : Jinhong Guo et al.

Page 1 of 1

It is certified that error appears in the above-identified patent and that said Letters Patent is hereby corrected as shown below:

<u>Title page,</u>
Item [73], Assignee, "Matsushita Electric Industrial Co., Ltd., Osaka (JP)" should be
-- Matsushita Electric Corporation of America, Princeton, NJ (US) --

<u>Column 9,</u>
Line 52, "use-drawn" should be -- user-drawn --

<u>Column 10,</u>
Line 39, "candidate," should be -- candidate --

<u>Column 11,</u>
Line 26, "use-drawn" should be -- user-drawn --

This certificate supersedes Certificate of Correction issued April 13, 2004.

Signed and Sealed this

Twenty-fourth Day of August, 2004

JON W. DUDAS
*Director of the United States Patent and Trademark Office*